(12) United States Patent
Joong et al.

(10) Patent No.: US 6,448,733 B1
(45) Date of Patent: Sep. 10, 2002

(54) XYZ-AXES TABLE

(75) Inventors: Kim Houng Joong, Hitachi; Ryouichi Naganuma, Hitachinaka; Hiromitsu Seino, Iwaki, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,678

(22) Filed: Feb. 26, 2001

(30) Foreign Application Priority Data

Nov. 2, 2000 (JP) ........................................ 2000-340365

(51) Int. Cl.[7] .............................................. H02K 41/03
(52) U.S. Cl. ........................................ 318/649; 318/687
(58) Field of Search ................................ 318/648, 649, 318/687, 38; 310/12

(56) References Cited

U.S. PATENT DOCUMENTS

| | | | | |
|---|---|---|---|---|
| 5,467,720 A | * | 11/1995 | Korenaga et al. | 108/20 |
| 5,668,421 A | * | 9/1997 | Gladish | 310/12 |
| 5,860,208 A | * | 1/1999 | Nomura | 29/740 |
| 5,982,065 A | * | 11/1999 | Jamain et al. | 310/90.5 |
| 6,078,114 A | * | 6/2000 | Bessette et al. | 310/12 |

* cited by examiner

Primary Examiner—Bentsu Ro
(74) Attorney, Agent, or Firm—Antonelli, Terry, Stout & Kraus, LLP

(57) ABSTRACT

A XYZ-axes table including a base, a plurality of linear guiding apparatuses, a stage, an X-axis drive linear motor, a Y-axis drive linear motor, and a Z-axis drive linear motor. The linear motor is constituted by an armature and a movable element being capable of relatively moving with respect to the armature. The linear motor further has magnetic poles and magnetic pole teeth arranged in a predetermined manner.

20 Claims, 10 Drawing Sheets

XYZ-AXES TABLE

BACKGROUND OF THE INVENTION

1. Field of the Invention

The present invention relates to an XYZ-axes table, and more particularly to an XYZ-axes table used for positioning a mask in a stepper device for producing a semiconductor, a machine tool and the other exposure apparatus.

2. Description of the Prior Art

In a conventional XYZ-axes table, in the case of using a linear motor, a linear motor having a structure in which a rotary machine is cut and opened so as to be driven in a linear manner.

In the XYZ-axes table, since the linear motor described in the prior art has a lot of leakage flux between an armature and a movable element, and a magnetic attraction force is applied to a portion between the armature and the movable element in one direction, a great load is applied to a support mechanism of the movable element, so that there is a problem that a strain is generated in the structure.

SUMMARY OF THE INVENTION

An object of the present invention is to provide an XYZ-axes table in which a magnetic attraction force generated between the armature and the movable element is made small by reducing a leakage of a magnetic flux passing through a portion between the armature and the movable element.

In accordance with one aspect of the present invention, there is provided an XYZ-axes table provided with a base, a plurality of linear guiding apparatuses, a stage, an X-axis drive linear motor, a Y-axis drive linear motor and a Z-axis drive linear motor. It is desirable that the linear motor is structured such as to be constituted by an armature and a movable element being capable of relatively moving with respect to the armature. Further, it is desirable that the structure is made such that the linear motor further has one magnetic pole teeth rows which are magnetically connected to one magnetic pole of the armature and are arranged so as to be separated into a first stage and a second stage in a substantially vertical direction to a moving direction of the movable element, and another magnetic pole teeth rows which are magnetically connected to another magnetic pole of the movable element and are arranged so as to be separated into a first stage and a second stage in a substantially vertical direction to the moving direction of the movable element, the first stage of magnetic pole teeth in the one magnetic pole teeth rows and the first stage of magnetic pole teeth in the another magnetic pole teeth row are alternately arranged with respect to the moving direction of the movable element, the second stage of magnetic pole teeth in the one magnetic pole teeth rows and the second stage of magnetic pole teeth in the another magnetic pole teeth row are alternately arranged with respect to the moving direction of the movable element, and the movable element is arranged between the one and another first stage of magnetic pole teeth rows and the one and another second stage of magnetic pole teeth rows.

In accordance with another aspect of the present invention, there is provided an XYZ-axes table structured such that the rails of the linear guiding apparatus are arranged at four portions comprising east, west, south and north portions of the base, the rails are integrally formed so that the slider guided by the rail so as to be freely moves and a relative moving direction of the armature form a vertical angle, the movable element is connected to the stage so as to form a cross shape, and the armature arranged in one east-west direction and the movable element arranged in another south-north direction are respectively driven as an X-axis drive linear motor and a Y-axis drive linear motor.

In accordance with the other aspect of the present invention, there is provided an XYZ-axes table structured such that four rails of the linear guiding apparatus are arranged in four portions comprising west, east, south and north portions on the base, the movable elements are overlapped and arranged with keeping a gap so as to form a cross shape, the sliders guided by the rails so as to freely move are connected to both ends thereof so that relative moving directions between the sliders and the movable elements are vertical with each other, the plurality of armatures are integrally formed with the stage by being gathered to an inner side of the linear guiding apparatus, the armature arranged in one east-west direction and the armature arranged in another south-north direction are respectively driven as the X-axis drive linear motor and the Y-axis drive linear motor.

In accordance with the other aspect of the present invention, there is provided an XYZ-axes table structured such that the rails of the linear guiding apparatus are arranged in the base so that the X and Y axes vertically cross to each other, the sliders guided by the rails so as to freely move are integrally formed with the armatures so that relative moving directions are vertical, the armatures are connected to the stage so as to form an L shape, and the armature arranged in one east-west direction and the armature arranged in another south-north direction are respectively driven as the X-axis drive linear motor and the Y-axis drive linear motor.

In accordance with the other aspect of the present invention, there is provided an XYZ-axes table structured such that an XY table and a Z-axis linear guiding apparatus respectively have a function of driving at an angle θ.

In accordance with the other aspect of the present invention, there is provided an XYZ-axes table structured such that each of the linear guiding apparatuses is independently arranged on the base or one-axis linear guiding apparatus is overlaid on another-axis linear apparatus, whereby the linear motor is used.

In accordance with the other aspect of the present invention, there is provided an XYZ-axes table, further comprising a closed loop control system constituted by the linear motor, a sensor detecting a relative displacement between the armature and the movable element and a magnetic pole, a control portion feeding back a signal of the sensor, and a power drive portion.

In accordance with the other aspect of the present invention, there is provided an XYZ-axes table, further comprising an open loop control system constituted by the linear motor, a control portion and a power drive portion.

In accordance with the other aspect of the present invention, there is provided an XYZ-axes table, further comprising a control system constituted by the linear motor, a power drive portion, and a control portion including estimating means for detecting an induced voltage of the linear motor and estimating a relative magnetic pole position between the armature and the movable element on the basis of the voltage detected value.

In accordance with the other aspect of the present invention, there is provided an XYZ-axes table, further comprising a control system comprising a linear motor, a power drive portion, and a control portion including estimating means for detecting an electric current flowing through the linear motor and estimating a relative magnetic pole position between the armature and the movable element on the basis of the current detected value.

In accordance with the other aspect of the present invention, there is provided an XYZ-axes table structured such that a plurality of armatures of the coaxially-driven linear motor are arranged and a pitch between magnetic pole teeth of the adjacent different armatures is set to (k·P+P/M) {(k=0, 1, 2, ... ), (M=2, 3, 4, ... )} {in which k is a number freely selected in a range that the adjacent armatures can be arranged, M is a number of phase of the motor} when the pole pitch is set to P.

In accordance with the other aspect of the present invention, there is provided an XYZ-axes table structured such that a through hole is provided in center portions of both of the XY table and the base.

In accordance with the other aspect of the present invention, there is provided an XYZ-axes table structured such that a compression air floating function or a magnetic floating function is provided between the base and the stage.

In accordance with the other aspect of the present invention, there is provided a semiconductor producing stepper apparatus, a machine tool or an exposing apparatus having the XY table or the XYZ-axes table as recited in any one of the previous features.

The features mentioned above and the other features of the present invention will be described below.

DESCRIPTION OF THE PREFERRED EMBODIMENTS

A description will be given below of embodiments in accordance with the present invention with reference to the accompanying drawings.

Figure 1:
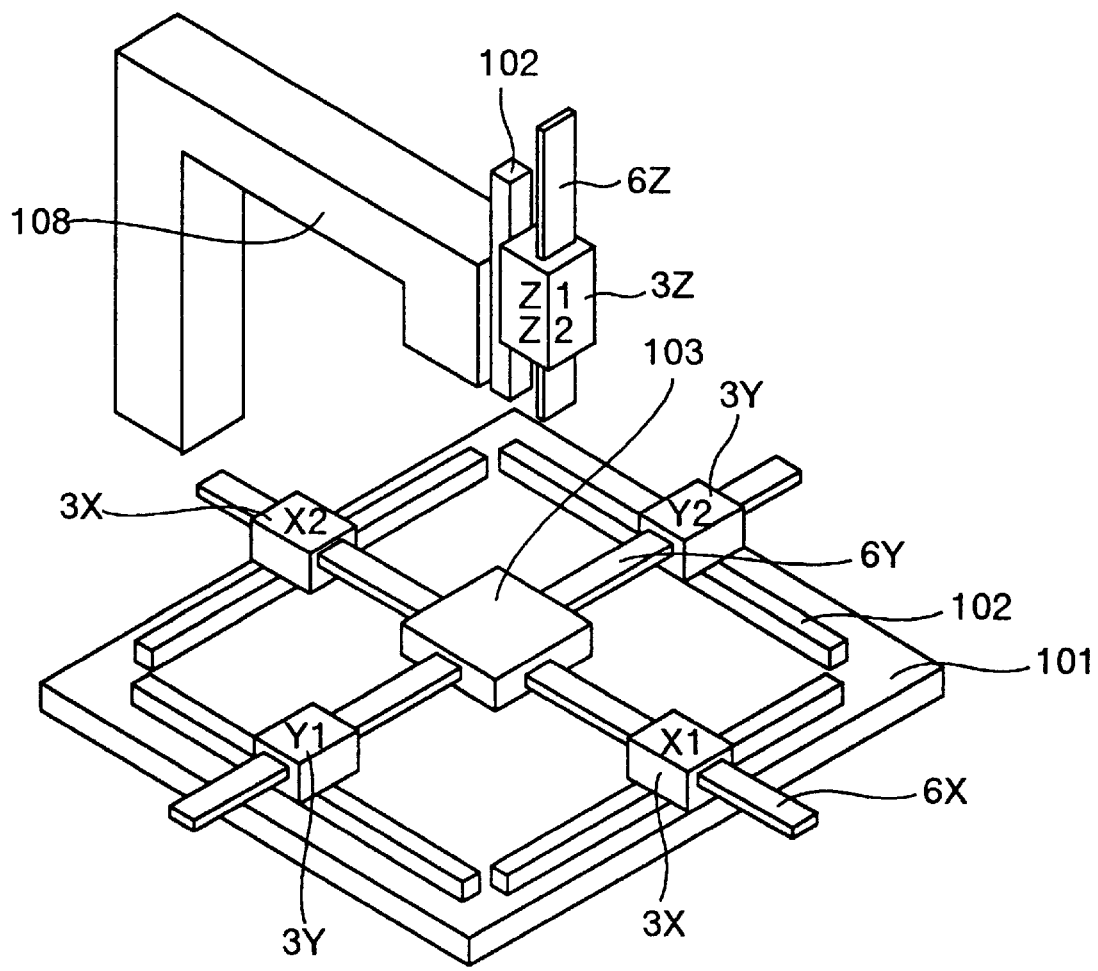
FIG. 1 is a schematic view showing a basic structure of an XYZ-axes table with a linear motor in accordance with an embodiment of the present invention.

FIG. 1 is a schematic view of a basic structure of an XYZ-axes table corresponding to an embodiment in accordance with the present invention.

In FIG. 1, reference numeral 101 denotes a base, reference numeral 102 denotes a rail of a linear guiding apparatus, reference numeral 103 denotes a stage, reference symbol 3X denotes an armature of an X-axis drive linear motor, reference symbol 3Y denotes an armature of a Y-axis drive linear motor, reference symbol 3Z denotes an armature of a Z-axis drive linear motor, reference symbols 6X, 6Y and 6Z denote a movable element in respective axes, and reference numeral 108 denotes an arm. Accordingly, the XYZ-axes table with the linear motor is constituted by the elements mentioned above. The armature 3X has portions X1 and X2. The armature 3Y has portions Y1 and Y2. The armature 3Z has portions Z1 and Z2.

Further, a smooth movement can be achieved between the base 101 and the stage 103 in accordance with an air floating operation or a magnetic floating operation. A portion capable moving in the X and Y axes on the base 101 can be consumed as an XY-axes table.

Figure 2:
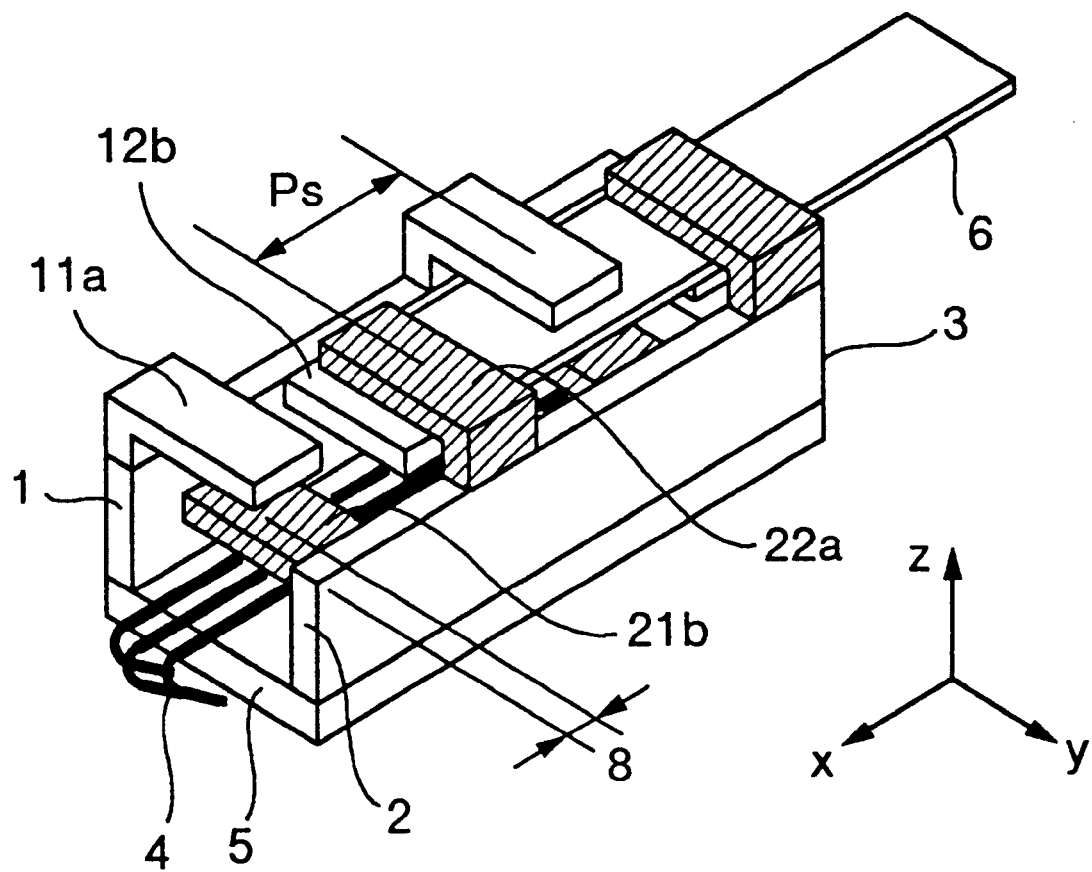
FIG. 2 is a schematic view of a linear motor used in the present invention.

FIG. 2 is a schematic view showing an embodiment of a linear motor for driving an axis which is used in the XYZ-axes table in accordance with the embodiment of the present invention.

In FIG. 2, the linear motor is a linear motor constituted by an armature 3 and a movable element 6 relatively moving with respect to the armature 3, and the linear motor further has one magnetic pole teeth row magnetically connected to one magnetic pole 1 of the armature and arranged so as to be separated into a first stage and a second stage in a substantially vertical direction with respect to a moving direction of the movable element.

Further, the linear motor has another magnetic pole teeth row magnetically connected to another magnetic pole 2 of the movable element and arranged so as to be separated into a first stage and a second stage in a substantially vertical direction with respect to the moving direction of the movable element. The oscillating type motor is structured such that the first stage magnetic pole teeth of the magnetic pole teeth row provide in one of them and the first stage magnetic pole teeth of the magnetic pole teeth row provided in another thereof are alternately arranged with respect to the moving direction of the movable element, the second stage magnetic pole teeth of the magnetic pole teeth row provide in one of them and the second stage magnetic pole teeth of the magnetic pole teeth row provided in another thereof are alternately arranged with respect to the moving direction of the movable element, and the movable element is arranged between the first stage magnetic pole teeth rows in one and another and the second stage magnetic pole teeth rows provided in one and another.

In this case, an upper magnetic pole teeth 11a and a lower magnetic pole teeth 21b in the armature are defined as a first opposing portion, and a lower magnetic pole teeth 12b and an upper magnetic pole teeth 22a are defined as a second opposing portion. Accordingly, the armature is constructed so that (2n−1)th iron core becomes a first opposing portion and (2n)th iron core becomes a second opposing portion (in this case, n=1, 2, 3, ... ).

Further, one coil 4 is received in the armature 3. There is provided a linear motor structured such that the movable element 6 is held between the first opposing portions, the movable element is held between the second opposing portions, and the movable element relatively moves with respect to the armature. In this case, the armature is constituted by an iron core, a permanent magnet, and the coil 4, and the movable element 6 may be constituted by a permanent magnet, a magnetic body and a coil combined by one kind or plural kinds of materials.

Figure 3A:
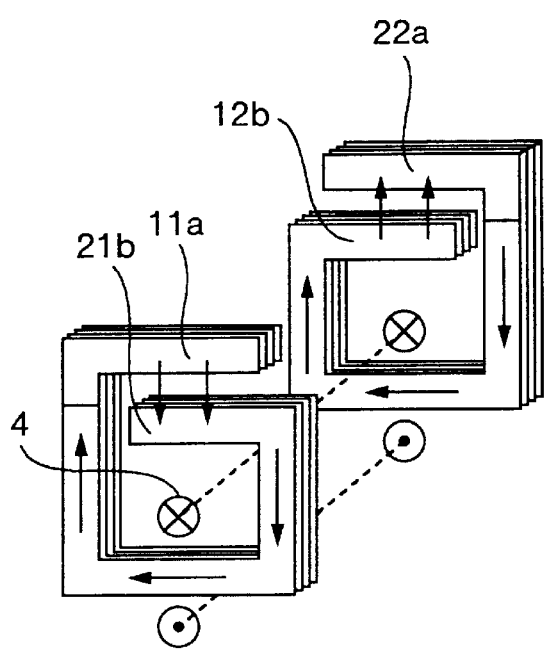
FIG. 3A is a schematic view showing a notion of a magnetic flux flow of a linear motor.
Figure 3B:
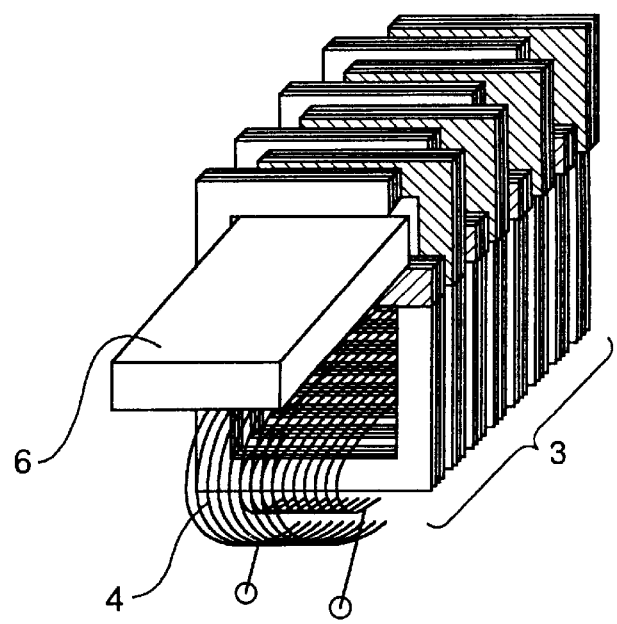
FIG. 3B is a schematic view showing an assembly constructed by separated cores.

FIGS. 3A and 3B show schematic views showing a notion of the magnetic flux flow of the linear motor in accordance with the present embodiment, and an assembly constructed by laminated steel plates. When the structure is made as shown in FIG. 2, the armature 3 in which the magnetic flux alternately flows in a vertical direction between the upper and lower magnetic pole teeth is formed in the gap between the upper magnetic pole teeth 11a or 22a and the lower magnetic pole teeth 21b or 12b in the respective opposing portions of the linear motor in accordance with the present embodiment, whereby the movable element 6 relatively moves through the gap, as shown in FIG. 3A.

Further, in the linear motor in accordance with the present embodiment, since an attraction force applied to the movable element 6 and the upper magnetic pole teeth and an attraction force applied to the movable element 6 and the lower magnetic pole teeth have substantially the same magnitude and the attraction forces are applied in the opposite directions, a total attraction force becomes small. Accordingly, it is possible to make the attraction force between the magnetic pole teeth of the movable element 6 and the armature 3 small, and it is possible to reduce a load of the supporting mechanism.

In FIG. 3B, the armature is constructed by laminated steel plates, and is structured such that plural sets of first opposing portions and second opposing portions are alternately arranged. Further, the magnetic pole portion (corresponding to the upper magnetic pole teeth 11a or 22a and the lower magnetic pole teeth 12b or 21b) having the iron core portion (corresponding to the iron core 5 in FIG. 5) in which the coil of the armature is arranged and the opposing portions between which the movable element is held is separately produced by the laminated steel plates and thereafter assembled.

Figure 4:
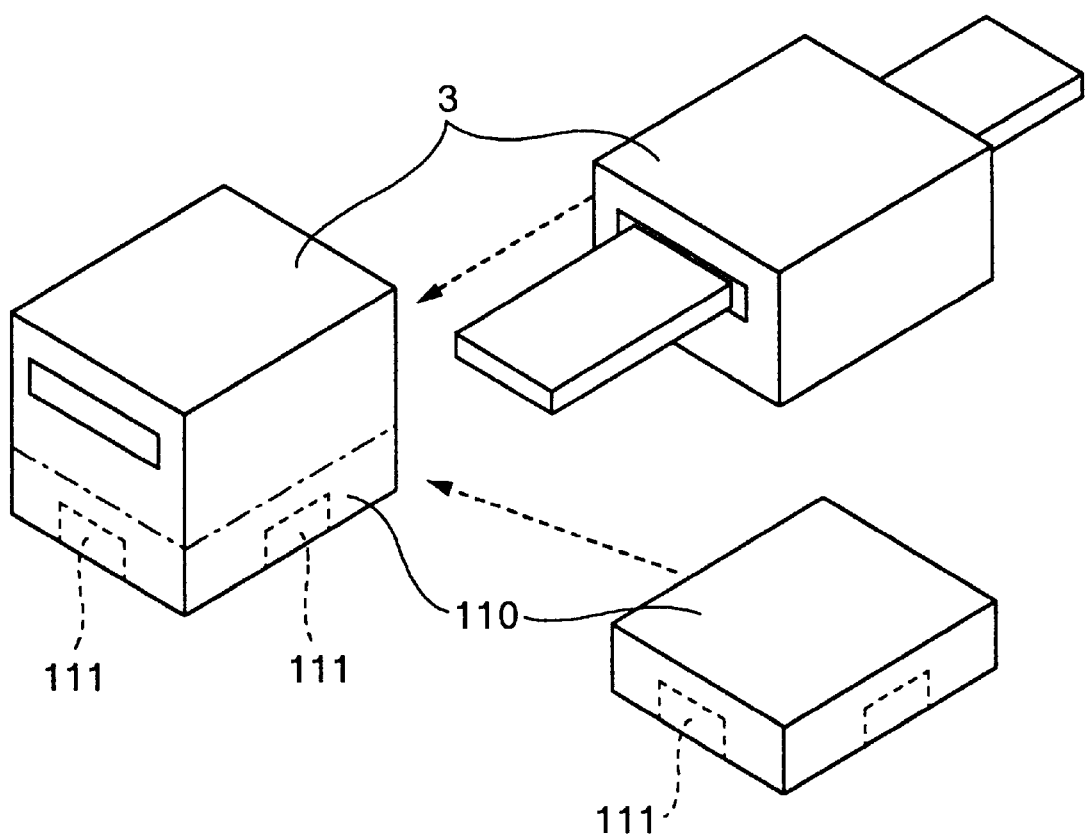
FIG. 4 is a schematic view showing a structure in which a molded linear motor and a slider are combined.

FIG. 4 shows an image of molding the armature constructed by the laminated steel plates shown in FIG. 3B.

The rail 102 of the linear guiding apparatus is held between the slide grooves 111 so as to be guided and supported in such a manner as to be integrally formed with the slider 110 of the linear guiding apparatus in the armature 3.

FIGS. 5A, 5B, 6A and 6B show control block diagram using the linear motor in accordance with the present embodiment.

Figure 5A:
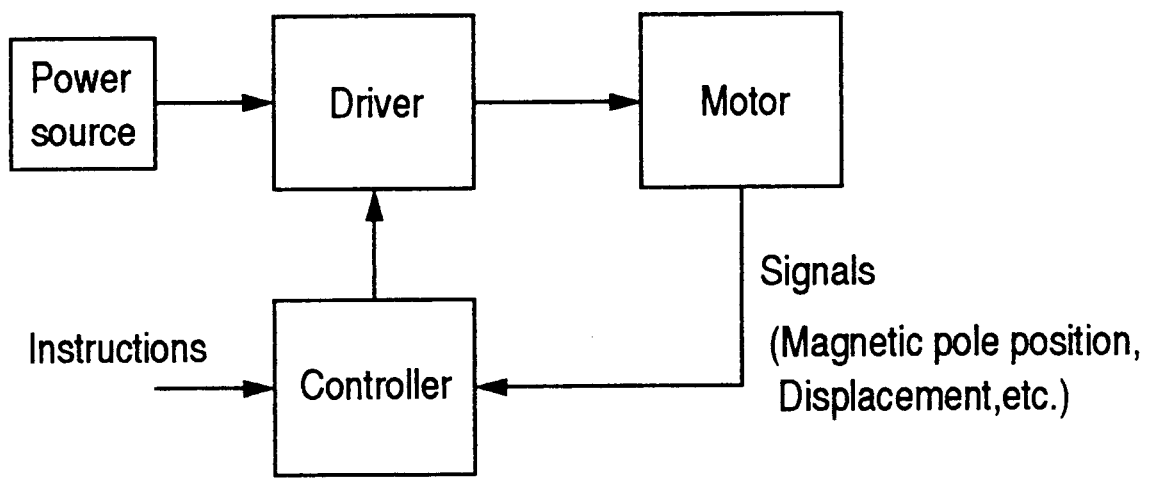
FIGS. 5A and 5B are control block diagrams of a structure using a linear motor in accordance with the present embodiment.

FIG. 5A shows a block diagram constituting a close loop control system comprising a sensor (not shown) detecting a relative displacement between the linear motor (Motor) constituted by the armature and the movable element, the armature and the movable element and the magnetic pole, the control portion (Controller) feeding back signals (Signals) of the sensor and the power drive portion (Driver and Power Source).

Figure 5B:
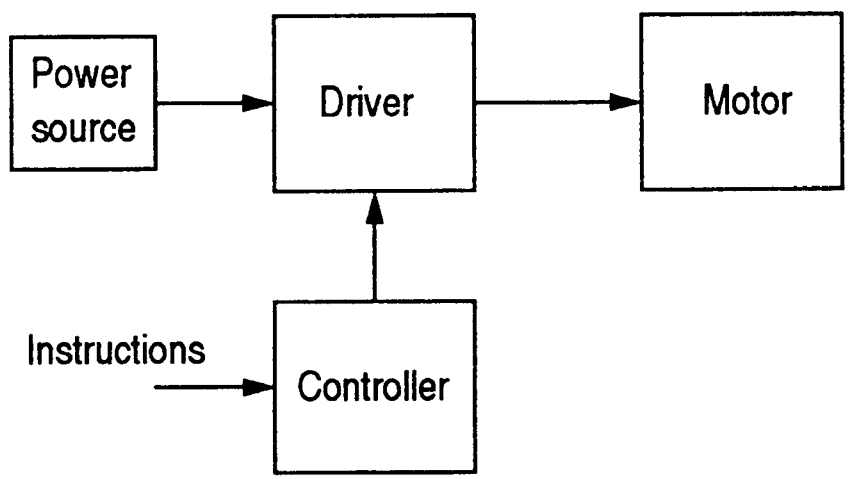

FIG. 5B shows a block diagram constituting an open loop control system comprising the linear motor (Motor) constituted by the armature and the movable element, the control portion (Controller) and the power drive portion (Driver and Power Source).

Figure 6A:
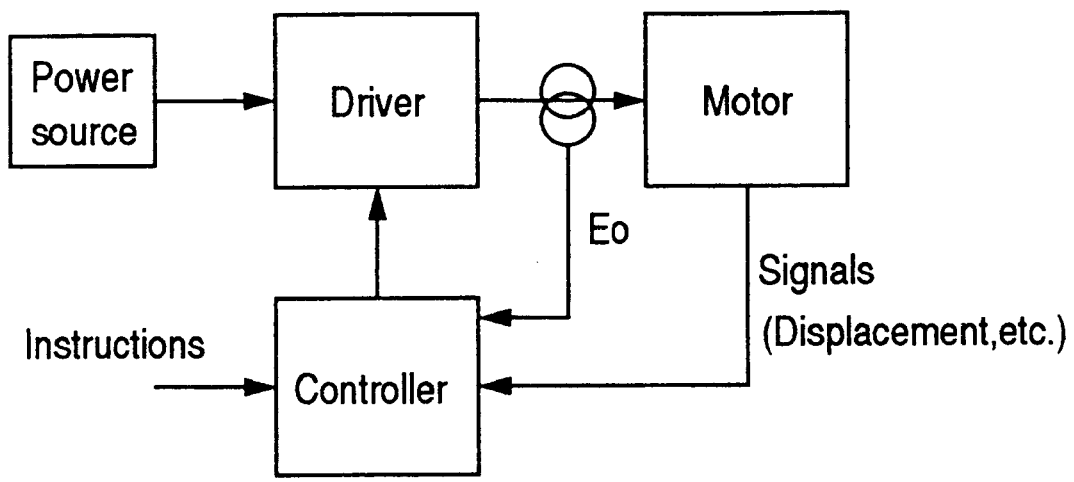
FIGS. 6A and 6B are another control block diagrams of a structure using a linear motor in accordance with the present embodiment.

FIG. 6A shows a block diagram constituting a magnetic pole sensorless control system comprising the linear motor (Motor) constituted by the armature and the movable element, a voltage sensor, the control portion (Controller) and the power drive portion (Driver and Power Source). In the present embodiment, an induced voltage (Eo) generated by the linear motor is read within the control portion by using the voltage sensor. A magnetic pole position is estimated from a magnitude of the induced voltage, within the control portion, and a signal for driving the linear motor is output to the power drive portion. In the control system in accordance with the present structure, the linear motor can be stably (without being out of step) driven without mounting a magnetic pole position sensor in the linear motor portion.

Figure 6B:
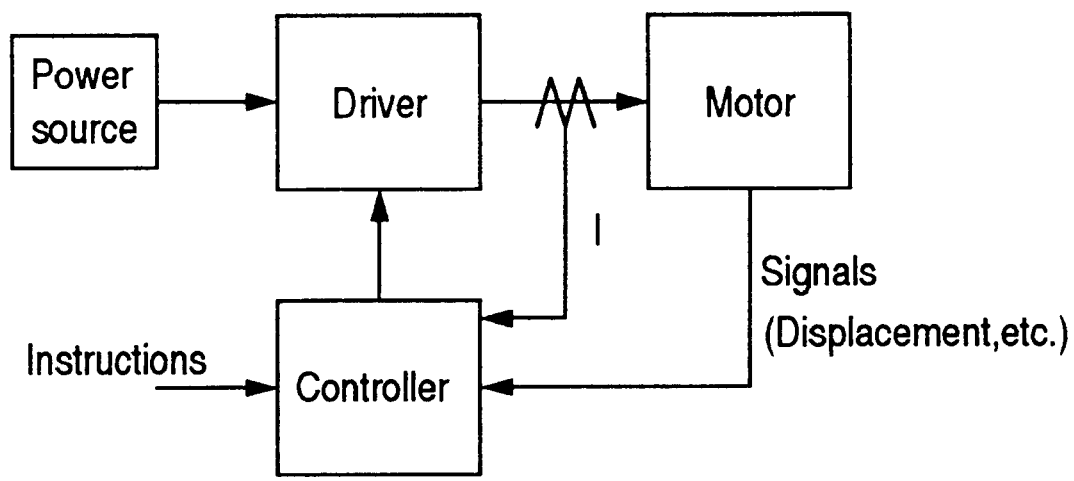

FIG. 6B shows a block diagram constituting a magnetic pole sensorless control system comprising the linear motor (Motor) constituted by the armature and the movable element, a current sensor, the control portion (Controller) and the power drive portion (Driver and Power Source). In the present embodiment, an electric current (I) flowing through the linear motor is read within the control portion by using the current sensor. Within the control portion, the induced voltage of the linear motor is calculated from a voltage applied to the linear motor and a detected current value, whereby the magnetic pole position is estimated and calculated. In the control system in accordance with the present structure, the linear motor can be stably (without being out of step) driven without mounting the magnetic pole position sensor to the linear motor portion.

Figure 7:
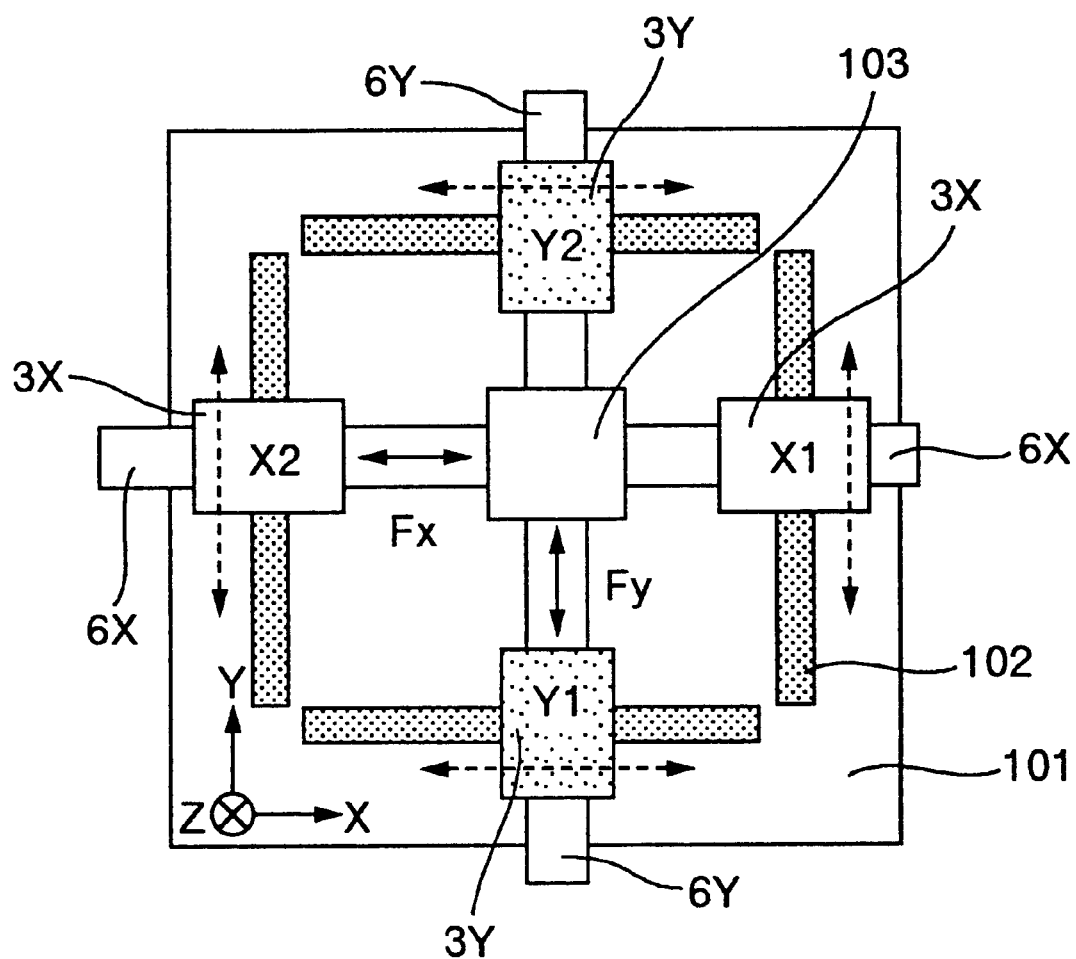
FIG. 7 is a schematic view showing an XYZ-axes table with a linear motor in accordance with an embodiment of the present invention.

FIG. 7 shows details of the XY table portion on the base 101 shown in FIG. 1. The XY table with the linear motor is structured such that the rails 102 of the linear guiding apparatus are arranged at four portions comprising east, west, south and north portions of the base 101, the rails are integrally formed so that the slider 110 guided by the rail so as to be freely moves and a relative moving direction of the armature form a vertical angle, the movable element is connected to the stage so as to form a cross shape, and the armature arranged in one east-west direction and the movable element arranged in another south-north direction are respectively driven as an X-axis drive linear motor and a Y-axis drive linear motor.

The linear motor used in the present embodiment is structured such that an armatures 3X1 (an X1 component of the armature 3X) and an armature 3X2 (an X2 component of the armature 3X) constitute the armature of the X-axis drive linear motor by a form of a pair, however, the same principle can be applied to the case of Y axis and Z axis.

In FIG. 7, in general, the armature 3X1 and the armature 3X2 are arranged in series so that a pitch between the magnetic pole teeth of the armature 3X1 and the magnetic pole teeth of the armature 3X2 satisfies the formula (k·P+ P/M) {(k=0, 1, 2, . . . ), (M=2, 3, 4, . . . )}. In this case, P is a pole pitch (the pole pitch P is selected from an armature magnetic pole pitch Ps and a movable element pole pitch Pm), and M is a number of phase of the motor. A plurality of permanent magnets are arranged in the movable element 6 so that the adjacent magnetic poles are different.

In FIG. 7, the armature 3X1 and the armature 3X2 may be arranged in series so that the pitch between the magnetic pole teeth of the armature 3X1 and the magnetic pole teeth of the armature 3X2 satisfies the formula {(k·P; k=0, 1, 2, . . . )} and a plurality of permanent magnets may be arranged so that a center of the magnetic poles between the armature 6X1 (a portion corresponding to X1 among the armature 6X) and the armature 6X2 (a portion corresponding to X2 among the armature 6X) satisfies the formula (k·P+P/M).

In other words, the armatures 6X1 and 6X2 are integrally formed by being (k·P+P/M) pitch shifted. Relatively, the armatures 6X1 and 6X2 are aligned and the centers of the armatures 3X1 and 3X2 may be (k·P+P/M) pitch shifted.

When exciting the coils 4 of the armatures 3X1 and 3X2 so that a moving magnetic field is alternately generated, a magnetic flux flows in an opposite direction at every pole pitches through the gap 8 between the upper magnetic pole surface and the lower magnetic pole surface, a propelling force is generated due to P/2 essential for moving, the movable element 6 relatively moves, and the stage 103 connected to the movable element freely moves.

In FIG. 7, a ferromagnetic substrate and a nonmagnetic substrate may be combined in the movable element 6 or the permanent magnet may be commonly used. Further, a relatively freely moving linear motor can be obtained by winding a coil generating a moving magnetic field around the movable element 6 in place of the permanent magnet and flowing a field current through the armature 3.

Here, in FIG. 7, the description is given of the structure in which two armatures are arranged in series, however, a plurality of armatures may be arranged in series. In the same manner, the structure may be made such that two armatures are arranged in parallel and two movable elements are integrally formed, or a plurality of armatures are arranged in parallel and a plurality of movable elements are integrally formed.

In this case, the description is given of the two-phase linear motor for the embodiment in accordance with the present invention, however, the present invention can be used as a multi-phase linear motor such as a three-phase, a four-phase, a five-phase or the like.

Figure 8:
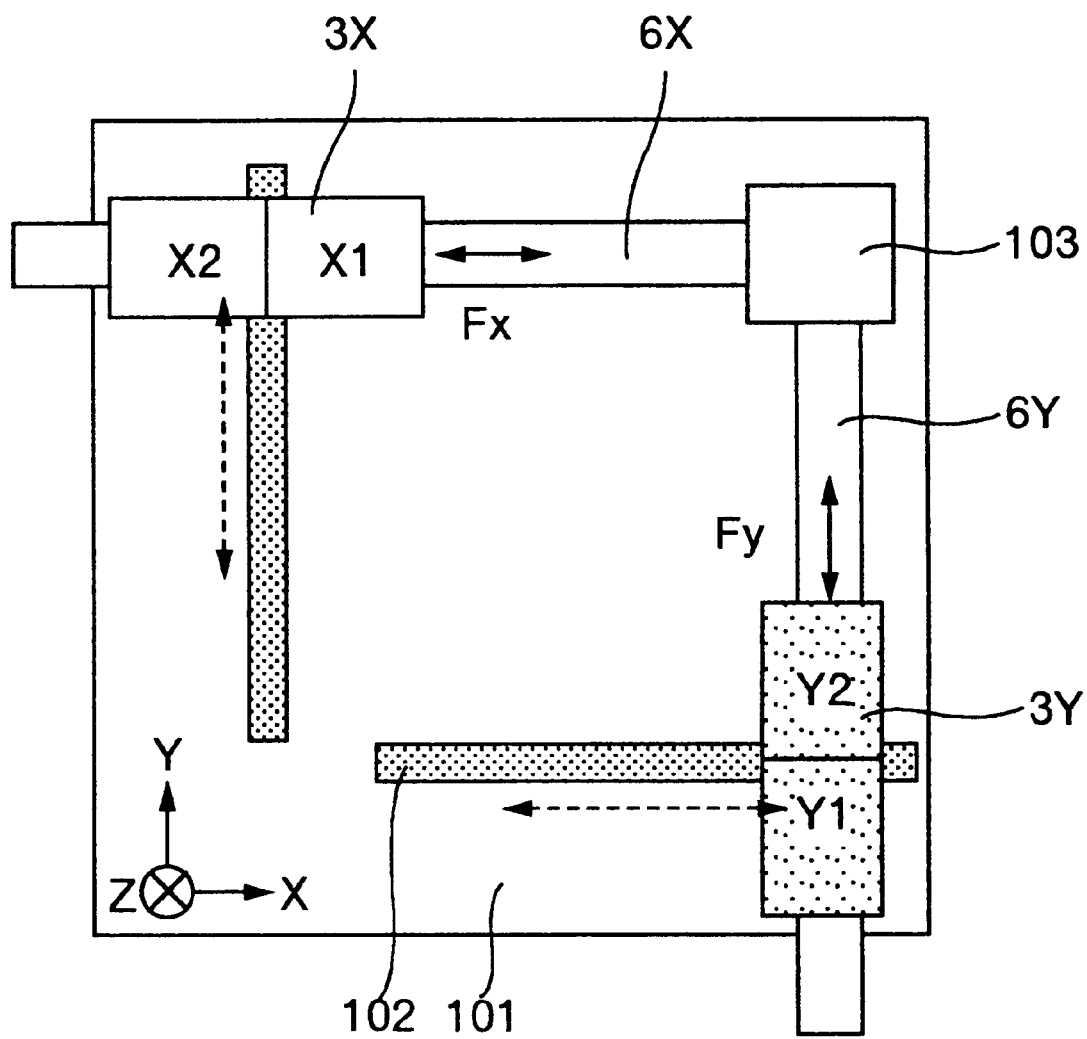
FIG. 8 is a schematic view showing an XYZ-axes table with a linear motor in accordance with another embodiment of the present invention.
Figure 9:
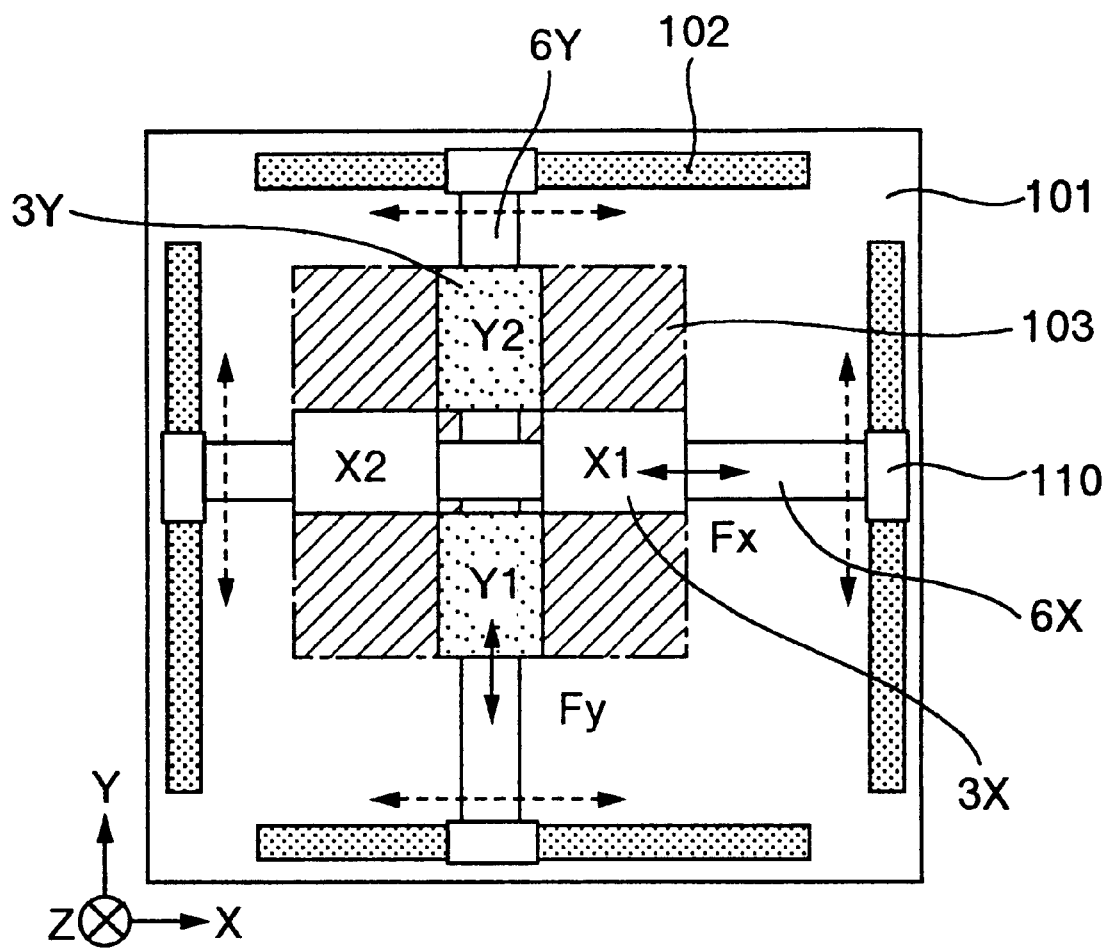
FIG. 9 is a schematic view showing an XYZ-axes table with a linear motor in accordance with the other embodiment of the present invention.
Figure 10:
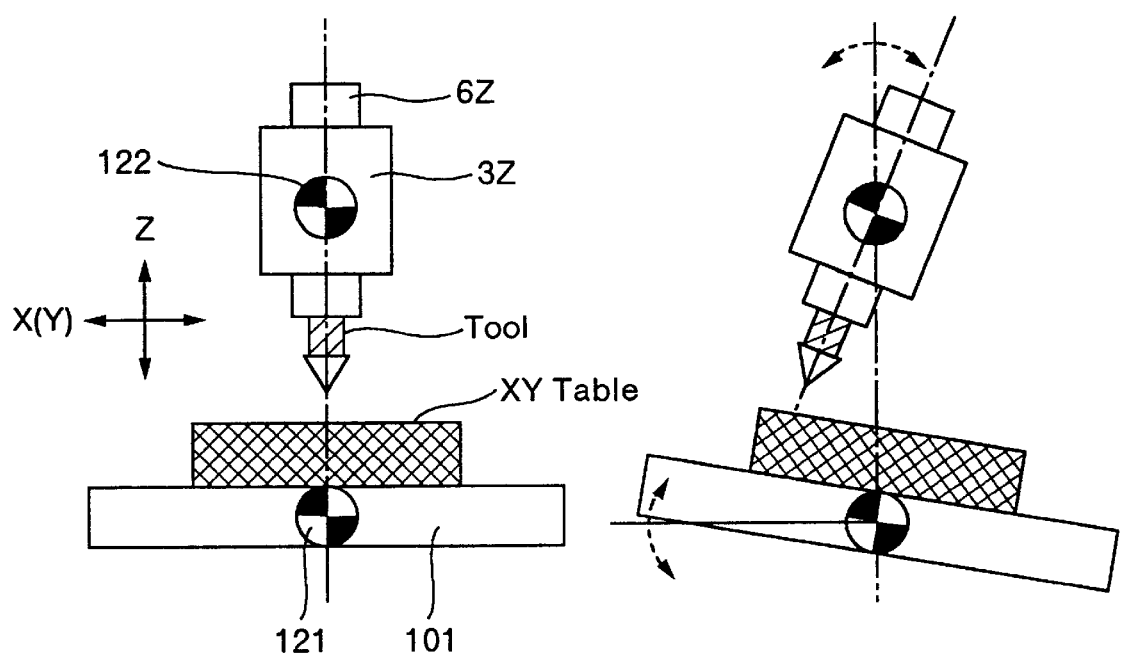
FIG. 10 is a schematic view showing an XYZ-axes table with a linear motor in accordance with the other embodiment of the present invention.

FIGS. 8, 9 and 10 show an XYZ-axes table in accordance with the other embodiments of the present invention.

FIG. 8 shows the other embodiment structured such that the armatures 3X1 and 3X2 shown in FIG. 7 are gathered to one portion in one side. The XY table with the linear motor is structured such that the rails 102 of the linear guiding apparatus are arranged in the base 101 so that the X and Y axes vertically cross to each other, the sliders guided by the rails 102 so as to freely move are integrally formed with the armatures so that relative moving directions are vertical, the armatures 6X and 6Y are connected to the stage 103 so as to form an L shape, and the armature 3X arranged in one east-west direction and the armature 3Y arranged in another south-north direction are respectively driven as the X-axis drive linear motor and the Y-axis drive linear motor. Since the linear motor can be combined as mentioned above, a freedom of arrangement is improved. Further, it is possible to reduce the number of the linear motor.

FIG. 9 shows the XY table structured such that four rails 102 of the linear guiding apparatus are arranged in four portions comprising west, east, south and north portions on the base, the movable elements 6X and 6Y are overlapped and arranged with keeping a gap so as to form a cross shape, the sliders 110 guided by the rails 102 so as to freely move are connected to both ends thereof so that relative moving directions between the sliders and the movable elements are vertical with each other, a plurality of armatures are integrally formed with the stage 103 by being gathered to an inner side of the linear guiding apparatus, the armature 3X arranged in one east-west direction and the armature 3Y arranged in another south-north direction are respectively driven as the X-axis drive linear motor and the Y-axis drive linear motor. Since the linear motor can be combined as mentioned above, it is possible to make the wire structure simple.

FIG. 10 shows a XYZ-axes table with a linear motor structured such that an XY table and a Z-axis linear guiding apparatus with a tool respectively have a function of driving at an angle θ. Accordingly, a freedom of working in the tool is increased. In place of the tool, a printing apparatus and an observing apparatus such as a microscope or the like can be added.

Further, since a through hole is provided in center portions of both of the XY table and the base, a long object can be mounted on the stage. Accordingly, it is possible to expand a range of the subject to be treated.

As mentioned above, in accordance with the embodiments of the present invention, since the linear motor can shorten a magnetic path of the magnetic circuit for an effective magnetic flux and reduces a leakage flux of the magnetic pole teeth, an efficiency can be improved. Further, in the linear motor in accordance with the present embodiment, since the attraction force applied to the movable element 6 and the upper magnetic pole teeth and the attraction force applied to the movable element 6 and the lower magnetic pole teeth have the same magnitude, and the attraction forces are applied in the opposite directions, the whole attraction force becomes small. Accordingly, it is possible to make the attraction force between the magnetic pole teeth of the movable element 6 and the armature 3 small, and it is possible to reduce a load of the support mechanism, whereby a durability can be improved. Further, it is possible to reduce the number of the parts and it is possible to make the XY table thin. Further, in accordance with the structure mentioned above, it is possible to provide a semi-conductor producing stepper apparatus having the XYZ-axes table or the XY table, the machine tool, the exposing apparatus or the like.

In accordance with the present invention, it is possible to provide the XY table or the XYZ-axes table having an improved efficiency and a high durability.

What is claimed is:

1. An XYZ-axes table comprising:

a base;

a plurality of linear guiding apparatuses;

a stage;

an X-axis drive linear motor;

a Y-axis drive linear motor; and a Z-axis drive linear motor, wherein said linear motor is structured such as to be constituted by an armature and a movable element being capable of relatively moving with respect to the armature, and said linear motor further has one magnetic pole teeth rows which are magnetically connected to one magnetic pole of said armature and are arranged so as to be separated into a first stage and a second stage in a substantially vertical direction to a moving direction of said movable element, and another magnetic pole teeth rows which are magnetically connected to another magnetic pole of said movable element and are arranged so as to be separated into a first stage and a second stage in a substantially vertical direction to the moving direction of said movable element, the first stage of magnetic pole teeth in said one magnetic pole teeth rows and the first stage of magnetic pole teeth in said another magnetic pole teeth row are alternately arranged with respect to the moving direction of said movable element, the second stage of magnetic pole teeth in said one magnetic pole teeth rows and the second stage of magnetic pole teeth in said another magnetic pole teeth row are alternately arranged with respect to the moving direction of said movable element, and said movable element is arranged between said one and another first stage of magnetic pole teeth rows and said one and another second stage of magnetic pole teeth rows.

2. An XYZ-axes table as claimed in claim 1, wherein the rails of said linear guiding apparatus are arranged at four portions comprising east, west, south and north portions of said base, said rails are integrally formed so that the slider guided by said rail so as to be freely moves and a relative moving direction of said armature form a vertical angle, said movable element is connected to said stage so as to form a cross shape, and said armature arranged in one east-west direction and said movable element arranged in another south-north direction are respectively driven as an X-axis drive linear motor and a Y-axis drive linear motor.

3. An XYZ-axes table as claimed in claim 2, wherein an XY table and a Z-axis linear guiding apparatus respectively have a function of driving at an angle θ.

4. An XYZ-axes table as claimed in claim 2, wherein each of the linear guiding apparatuses is independently arranged on said base or one-axis linear guiding apparatus is overlaid on another-axis linear apparatus, whereby said linear motor is used.

5. An XYZ-axes table as claimed in claim 1, wherein four rails of said linear guiding apparatus are arranged in four portions comprising west, east, south and north portions on said base, said movable elements are overlapped and arranged with keeping a gap so as to form a cross shape, the sliders guided by said rails so as to freely move are connected to both ends thereof so that relative moving directions between the sliders and the movable elements are vertical with each other, the plurality of said armature are integrally formed with said stage by being gathered to an inner side of said linear guiding apparatus, said armature arranged in one east-west direction and said armature arranged in another south-north direction are respectively driven as the X-axis drive linear motor and the Y-axis drive linear motor.

6. An XYZ-axes table as claimed in claim 5, wherein an XY table and a Z-axis linear guiding apparatus respectively have a function of driving at an angle θ.

7. An XYZ-axes table as claimed in claim 5, wherein each of the linear guiding apparatuses is independently arranged on said base or one-axis linear guiding apparatus is overlaid on another-axis linear apparatus, whereby said linear motor is used.

8. An XYZ-axes table as claimed in claim 1, wherein the rails of said linear guiding apparatus are arranged in said base so that the X and Y axes vertically cross to each other, the sliders guided by said rails so as to freely move are integrally formed with the armatures so that relative moving directions are vertical, said armatures are connected to said stage so as to form an L shape, and the armature arranged in one east-west direction and the armature arranged in another south-north direction are respectively driven as the X-axis drive linear motor and the Y-axis drive linear motor.

9. An XYZ-axes table as claimed in claim 8, wherein an XY table and a Z-axis linear guiding apparatus respectively have a function of driving at an angle θ.

10. An XYZ-axes table as claimed in claim 8, wherein each of the linear guiding apparatuses is independently arranged on said base or one-axis linear guiding apparatus is overlaid on another-axis linear apparatus, whereby said linear motor is used.

11. An XYZ-axes table as claimed in claim 1, wherein an XY table and a Z-axis linear guiding apparatus respectively have a function of driving at an angle 74 .

12. An XYZ-axes table as claimed in claim 1, wherein each of the linear guiding apparatuses is independently arranged on said base or one-axis linear guiding apparatus is overlaid on another-axis linear apparatus, whereby said linear motor is used.

13. An XYZ-axes table as claimed in any one of claims 1 to 12, further comprising a closed loop control system constituted by said linear motor, a sensor detecting a relative displacement between said armature and said movable element and a magnetic pole, a control portion feeding back a signal of the sensor, and a power drive portion.

14. An XYZ-axes table as claimed in any one of claims 1 to 12, further comprising an open loop control system constituted by said linear motor, a control portion and a power drive portion.

15. An XYZ-axes table as claimed in any one of claims 1 to 12, further comprising a control system constituted by said linear motor, a power drive portion, and a control portion including estimating means for detecting an induced voltage of said linear motor and estimating a relative magnetic pole position between said armature and said movable element on the basis of said voltage detected value.

16. An XYZ-axes table as claimed in any one of claims 1 to 12, further comprising a control system comprising a linear motor, a power drive portion, and a control portion including estimating means for detecting an electric current flowing through said linear motor and estimating a relative magnetic pole position between said armature and said movable element on the basis of said current detected value.

17. An XYZ-axes table as claimed in claim 1, wherein a plurality of armatures of said linear motor are arranged and a pitch between magnetic pole teeth of adjacent different armatures is set to (k·P+P/M) {(k=0, 1, 2, . . . ), (M=2, 3, 4, . . . )} {in which k is a number freely selected in a range that the adjacent armatures can be arranged, M is a number of phase of the motor} when the pole pitch is set to P.

18. An XYZ-axes table as claimed in claim 1, wherein a through hole is provided in center portions of both of an XY table and said base.

19. An XYZ-axes table as claimed in claim 1, wherein a compression air floating function or a magnetic floating function is provided between said base and said stage.

20. A semiconductor producing stepper apparatus, a machine tool or an exposing apparatus having an XY table or the XYZ-axes table as claimed in claim 1.

* * * * *